(12) United States Patent
Finch et al.

(10) Patent No.: US 11,055,434 B2
(45) Date of Patent: *Jul. 6, 2021

(54) PROCESS FOR COLLECTING ELECTRONIC PROTECTED HEALTH INFORMATION WITHOUT A LOGIN

(71) Applicant: Mend VIP, Inc., Orlando, FL (US)

(72) Inventors: Craig Finch, Winter Park, FL (US); Brandon Lassiter, Orlando, FL (US); Matthew D. McBride, Orlando, FL (US); Paul Senzee, Apopka, FL (US); Michael E. Soule, Casselberry, FL (US)

(73) Assignee: Mend VIP, Inc., Orlando, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/993,564

(22) Filed: Aug. 14, 2020

(65) Prior Publication Data

US 2020/0380163 A1  Dec. 3, 2020

Related U.S. Application Data

(63) Continuation of application No. 15/923,333, filed on Mar. 16, 2018, now Pat. No. 10,776,512.

(60) Provisional application No. 62/472,927, filed on Mar. 17, 2017.

(51) Int. Cl.
*H04L 29/06* (2006.01)
*H04L 29/08* (2006.01)
*G06F 21/31* (2013.01)
*G06F 21/62* (2013.01)

(52) U.S. Cl.
CPC .......... *G06F 21/6245* (2013.01); *G06F 21/31* (2013.01); *H04L 63/083* (2013.01); *H04L 63/102* (2013.01); *H04L 63/105* (2013.01); *H04L 67/02* (2013.01); *H04L 67/125* (2013.01);
(Continued)

(58) Field of Classification Search
CPC ..... G06F 21/6245; G06F 21/31; H04L 67/14; H04L 67/40; H04L 67/125; H04L 67/02; H04L 63/083; H04L 63/102; H04L 63/105; H04L 63/08; H04L 63/18
See application file for complete search history.

(56) References Cited

U.S. PATENT DOCUMENTS

2005/0027567 A1   2/2005  Taha
2006/0227378 A1*  10/2006  Mihira ............... G06F 21/6218
                                                        358/1.16
(Continued)

*Primary Examiner* — Nelson S. Giddins
(74) *Attorney, Agent, or Firm* — Maier & Maier, PLLC (57) ABSTRACT

An efficient and secure process by which users may enter sensitive information into an electronic information system. When information is required from a user, the electronic information system may be configured to generate a unique access link (uniform resource locator, or URL) for that user. The link may be sent to the user via electronic communication, such as a text message or email. When the user follows the link with a web browser, the system prompts the user to enter an additional piece of personal information that is not known to the general public. Once identity is verified, the user may be required to electronically sign agreements. The user is then prompted to enter the required information. This may allow a user to deposit sensitive information into the system without requiring the user to provide full login credentials.

18 Claims, 4 Drawing Sheets

(52) U.S. Cl.
CPC .............. *H04L 67/14* (2013.01); *H04L 67/40* (2013.01); *H04L 63/08* (2013.01); *H04L 63/18* (2013.01)

(56) References Cited

U.S. PATENT DOCUMENTS

| | | | |
|---|---|---|---|
| 2015/0271241 A1* | 9/2015 | Sun | H04N 21/43615 709/217 |
| 2016/0357981 A1* | 12/2016 | Tzeng | G06F 21/6218 |
| 2017/0083534 A1* | 3/2017 | Strong | H04L 63/12 |
| 2017/0169168 A1 | 6/2017 | Batchelor et al. | |
| 2017/0272426 A1 | 9/2017 | Wertz | |
| 2017/0351866 A1 | 12/2017 | Goh et al. | |

* cited by examiner

PROCESS FOR COLLECTING ELECTRONIC PROTECTED HEALTH INFORMATION WITHOUT A LOGIN

CROSS-REFERENCE TO RELATED APPLICATIONS

This application claims priority as a continuation of U.S. patent application Ser. No. 15/923,333, filed Mar. 16, 2018, entitled "PROCESS FOR COLLECTING ELECTRONIC PROTECTED HEALTH INFORMATION WITHOUT A LOGIN," which claims priority to U.S. Provisional Patent Application No. 62/472,927, filed on Mar. 17, 2017, entitled "PROCESS FOR COLLECTING ELECTRONIC PROTECTED HEALTH INFORMATION WITHOUT A LOGIN," the entire contents of which are hereby incorporated by reference.

BACKGROUND

The health care system needs to collect information from patients, providers, and others in order to function. This information is frequently of a sensitive nature, so sufficient security precautions must be taken to safeguard the information and comply with government regulations. For example, such systems must comply with the requirements of the Health Insurance Portability and Accountability Act of 1996 ("HIPAA"), as well as the Health Information Technology for Economic and Clinical Health Act, enacted under Title XIII of the American Recovery and Reinvestment Act of 2009 ("HITECH").

However, security often must be balanced against accessibility. Very secure processes for collecting healthcare information may be inconvenient to patients or caregivers, and sufficiently onerous processes might be an obstacle to actually collecting healthcare information. Alternatively, such processes might be bypassed or worked around if the capability exists to do so, negating much of their security value.

SUMMARY

An efficient and secure process by which users may enter sensitive information into an electronic information system may be provided. When information is required from a user, the electronic information system may be configured to generate a unique access link (uniform resource locator, or URL) for that user. The link may be sent to the user via electronic communication, such as a text message or email. When the user follows the link with a web browser, the system prompts the user to enter an additional piece of personal information that is not known to the general public. (Certain examples of this additional piece of information may include, for example, a video connection in which the user's physical appearance may be verified or an audio connection in which a voice recognition system may verify the user's voice, or alternatively may include a medical history, a clinical assessment, a survey, a photo, a PDF document or any other electronic document, payment information such as credit card information, or any other information or agreements such as may be desired. According to some exemplary embodiments, a portion of a document or piece of information, such as a portion of a medical history or even a single line item in the medical history, or a combination of documents or pieces of information—or a combination of portions—may be used instead.) Once identity is verified, the user may be required to electronically sign agreements. The user is then prompted to enter the required information.

Such a system may, by design, permit a user to enter information without requiring the user to enter a username and password. If the user accesses the system in such a manner, without entering a username and password, the user may be given access in a "no-login" state.

In the "no-login" state, the user may not have access to any protected health information. This means that the user may not be provided with any information by following the unique link. (However, in an exemplary embodiment, the user may thereafter be able to provide a username and password, or other information, to gain access to a "login" state.)

In the "no-login" state, the user may be able to push data into the system. However, as discussed, the user may be "firewalled" from doing anything else. This may be analogized to a bank deposit, wherein a user may be able to deposit funds in the bank account of another (or a bank account for which they have not provided appropriate credentials) but may be firewalled from withdrawing money from the account or otherwise accessing its funds.

In an exemplary embodiment, such a process for collecting electronic protected health information without a login may comply with security recommendations regarding two-factor authentication. Although a login and password may not be required to deposit information, a sufficient level of security may be achieved because two factors are required to submit information: something the user has (the unique link) and something the user knows (personally identifying information).

In an exemplary embodiment, the system may be configured to comply with HIPAA/HITECH regulations because it does not expose protected health information (PHI) of any kind. The user may opt to submit the requested information, and it may be entered without requiring all of the information stored for the user to be exposed.

According to an exemplary embodiment, a system for providing an efficient and secure interface for transferring protected electronic information may be configured to perform the following steps. First, the system may generate and send, from a server, to a user address, a unique access link, the unique access link comprising a uniform resource locator (URL) directed to a transfer login page, the transfer login page being a web page permitting uploading of protected electronic information and denying access to protected electronic information. (In an exemplary embodiment, the user may have already created a user account prior to this stage.) The system may then receive a request, from a user device, to access the transfer login page, and obtain, from the user device, a personal identifier. This personal identifier may be, for example, a record of the user (such as, for example, a date of birth of the user), some physical attribute of the user (such as a user's personal photograph), or some other record such as may be desired. The system may then verify the personal identifier, and, when the personal identifier is verified, grant the user device access to the transfer login page.

The system may also provide a full login page separate from the transfer login page, wherein the full login page is a web page permitting uploading of protected electronic information and permitting access to protected electronic information. At this point, the system may receive a request, from the user device, to access the full login page, and obtain, from the user device, user login credentials distinct from the personal identifier, such as password information.

These user login credentials may then be verified, and, when the login credentials are verified, the system may grant the user device access to the full login page.

In an exemplary embodiment, an access link may be provided to the full login page on the transfer page. This may be, for example, a password entry field where the user can provide their full credentials.

In an exemplary embodiment, the system may include a secure application (such as a secure application running on a mobile device of the user) which may be used to verify the existence of one or more records or other subjects of photography. For example, according to an exemplary embodiment, a user may need to take a photo of themselves with the secure application, or a photo of some record. Alternatively, the personal identifier can be any other record or identifying information such as may be desired.

In some exemplary embodiments, it may be verified that the user is one that has consented to use the service, or it may otherwise be requested that the user sign one or more agreements before using the service. In such embodiments, an electronic signature may be collected from the user.

In some exemplary embodiments, the system may be used to establish at least one of a real-time audio or video connection.

In some exemplary embodiments, the system may instead be implemented on a kiosk. In such embodiments, it may be desired to have the user input other information (such as a separate password or PIN) in lieu of having the user select a unique link. In an exemplary embodiment, a kiosk may also be used to take audio or video data, such as a photograph if desired. In some embodiments, an administrator may monitor the user's activity on the kiosk, and may be able to cut off the user's access; in other embodiments, the user's access may be terminated after a certain time period or after the user has been inactive for some time.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a process for collecting electronic protected health information without a login may be disclosed.

Figure 1:
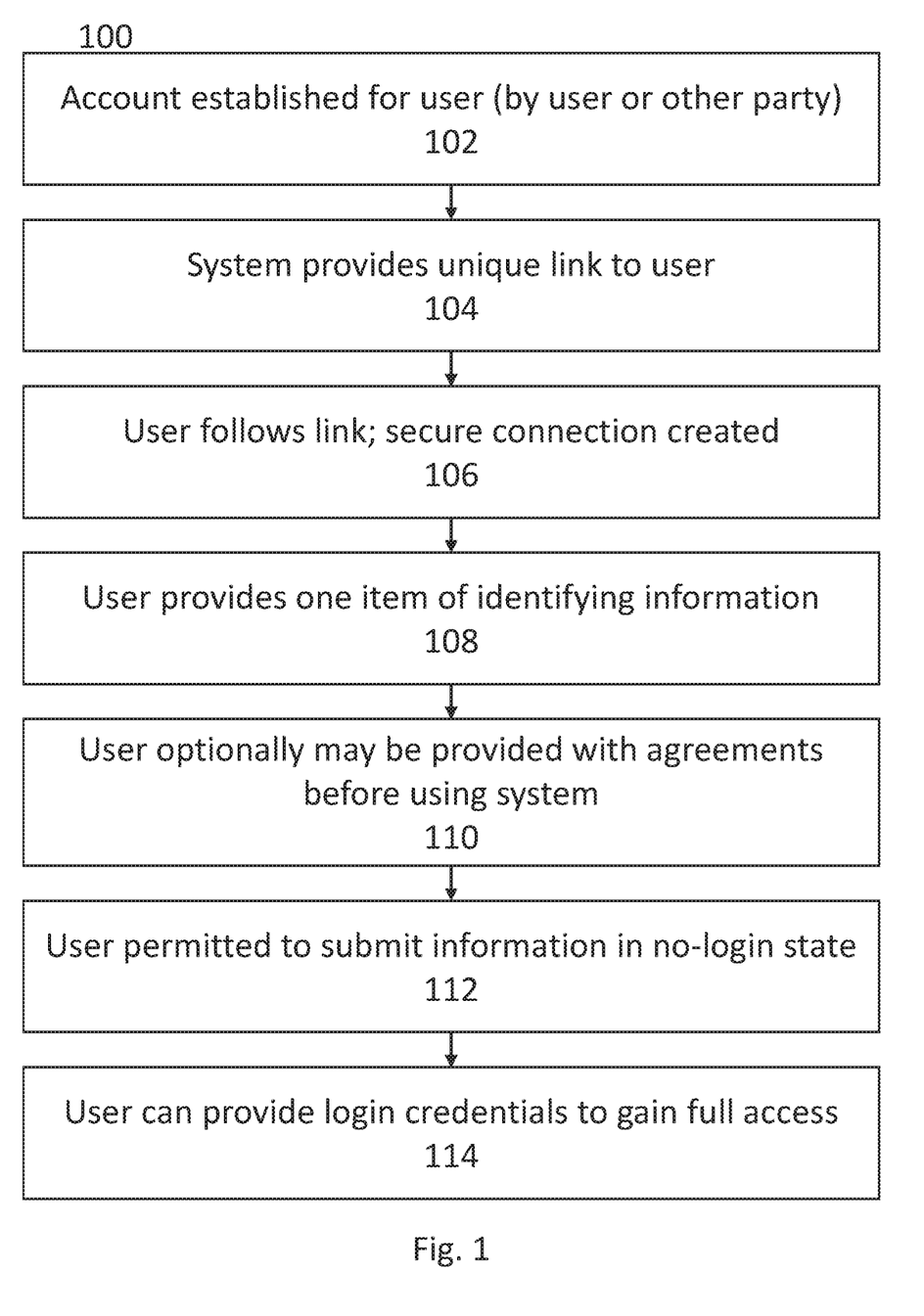
FIG. 1 is an exemplary flowchart depicting an exemplary embodiment of a process for collecting electronic protected health information without a login.

Turning now to exemplary FIG. 1, FIG. 1 displays an exemplary flowchart depicting an exemplary embodiment of a process for collecting electronic protected health information without a login 100.

In a first step 102, a user may establish an account, or an account may otherwise be established for a user. According to some exemplary embodiments, a variety of ways for an account to be established for a user may be contemplated; for example, according to some exemplary embodiments, a staff member with certain permissions may be able to make an account for a user or may be required to create or approve an account for a user. In another exemplary embodiment, an account may be created for a user by importing it from another service or by exporting it from the other service to the present service; in some exemplary embodiments, a user (or other party such as a staff member with permission to import data) may have the option to adjust certain information as necessary, such as the user's name if the user wants to use a different form of their name (such as a full legal name) that they were not using in the other account, or different payment information or contact information, or any other information such as may be desired. Alternatively, an account created for another service or for another organization may be automatically linked to the present account without requiring an import or export step. The establishment of such an account may require the user to enter a minimum set of personally identifiable information into the system. This may include one or more somewhat obscure items of personal information that may be used as the basis for identifying a user later on; for example, in an exemplary embodiment, a system may solicit a user's middle name, maiden name, or date of birth for such a purpose.

According to an exemplary embodiment, the system may be designed for use by any of patients, health care providers, staff members at a health care facility, or outside contractors. In an exemplary embodiment, a user may be a member of any such group. In an exemplary embodiment, the user experience provided to some groups may be different from that of some other groups; for example, it may be desirable to provide a somewhat higher level of security for submitting information when the user is a healthcare professional than when the user is a patient, and as such healthcare professionals may be requested to provide multiple items of information in order to access a no-login state. In some exemplary embodiments, the user permissions provided to a member of any one such group may be different from the user permissions provided to a member of another such group; for example, according to some exemplary embodiments, account creation privileges may be restricted to, for example, certain staff members at a health care facility or certain health cate providers, while patients or outside contractors may still be able to use the system once an account has been established for them.

In a next step 104, the system may provide a unique link, such as a uniform resource locator (URL) link, to a user. In an exemplary embodiment, such a link may be provided by email, by text message, or by another acceptable method for electronic communication, as may be desired. In some embodiments, user may be able to customize their electronic communication preferences; for example, a vision-impaired patient may request that the link be read to them in a telephone call.

According to an exemplary embodiment, a link may expire after a time interval. In an exemplary embodiment, this may be a predefined time interval, or may be a customized time interval; for example, a first form of communication may have a first time interval associated with it, and a second form of communication may have a second time interval associated with it, such that a user who receives a link via email has a longer or shorter time to access the link.

In some exemplary embodiments, links may expire by other methods instead of, or in addition to, time interval-based expiration. For example, according to an exemplary embodiment, a link may expire after it has been followed a certain number of times. For example, in one exemplary embodiment, a link may expire after it has been followed once, or followed a predefined number of times. In another exemplary embodiment, a link may expire after it has been followed once (or multiple times) and used successfully by the user to access a no-login state and deposit information, and may not expire if it is followed but not used successfully by the user to access a no-login state and deposit information (such as, for example, if the user does not complete one or more agreements or does not deposit information). In some exemplary embodiments, links may have one or more other security properties associated with them, as may be desired. According to an exemplary embodiment, an expiration status of a link may depend on the account or the user privileges of the account, or may be set by an account with particular user privileges. For example, an on-site account such as a staff account may have additional privileges (for example, it may be able to authorize the creation of accounts for patients, or may be able to manage the importing of accounts from other organizations or perform other management of accounts) and it thus may be desired to ensure that the account creation process for a staff member has additional security (for example, a link may expire in a very short period of time or after a single use, after which the staff member may have to request a new link) as compared to the account creation process for a patient (which may be more lenient, may allow for multiple account creation attempts and may expire only when an account is verified as being successfully created). Other embodiments may also be contemplated and may be implemented as desired.

In a next step 106, when a user has received a unique link, the user may access the unique link by a properly-equipped device, which may create a secure, encrypted connection between a web browser of the user and the system. According to an exemplary embodiment, one or more industry-standard encryption standards, such as SSL or TLS, or another form of encryption may be used in order to secure the connection.

In a next step 108, the user may be solicited for one or more pieces of identifying information. In an exemplary embodiment, this piece of information may be selected from the records of the user, and may be, for example, a user's date of birth. In another exemplary embodiment, the piece of information may be a piece of information specified by a user as an answer to a security question, or may be another password or passphrase (which may permit the use of a smaller password or passphrase than would otherwise be used, or may permit the use of a password or passphrase that the user is not asked to regularly update).

In a next step 110, the system may optionally prompt the user with one or more agreements that the user may be required to agree to before using the system. (In other exemplary embodiments, this may not be required, or may even be required at a different step; for example, it may be contemplated that users may be reminded of the agreements any time they attempt to use the system, and as a result the users may be provided with the agreements at an early step in the process, before they have signed in and regardless of whether they have already signed the agreements or not.) In an exemplary embodiment, a user may be asked to electronically sign the agreements before they are granted permission to use the system. In an exemplary embodiment, such agreements may be presented and archived in a manner that specifically complies with government regulations, for example the federal ESIGN act.

In a next step 112, a user may be permitted to submit information in the no-login state. For example, according to an exemplary embodiment, a user may be permitted to submit one or more forms, photos, documents, or any other type of information. In another exemplary embodiment, a user may submit photos of a driver's license or other forms of identity. In another exemplary embodiment, a user may submit payment information. In another exemplary embodiment, a user may submit health insurance information, or other information that may be related to reimbursement for care. In another exemplary embodiment, a user may submit any other piece of information that may be necessary to provide, facilitate, monitor, or transition care.

In an exemplary embodiment, the system may establish or may have the option of establishing a real-time audio, video, or audio/video session between the user's system and one or more other systems. This may operate to connect one or more patients to one or more health care professionals or anyone else involved in the care delivery process.

In an exemplary embodiment, the system may include a dedicated application provided to the user through which the user may be permitted or may be required to submit one or more items of information. In some exemplary embodiments, such an application may be analogous to a mobile banking application and may offer similar capabilities. For example, according to an exemplary embodiment, a user may be required to use a smartphone application to take a photograph of the one or more forms of identity of the user (such as the user's driver's license) rather than permitting the user to upload a photograph. This may ensure that the photos are current photos, and that the photos are not stored on the device and are properly encrypted when transmitted.

In an exemplary embodiment, a user may at any time be able to provide credentials in order to gain full access 114. In another embodiment, a first system may permit the deposit of information in a "no-login" state, and a separate second system may permit the deposit and retrieval of information when a login is provided may be separate systems, which may function to provide additional security.

Figure 2:
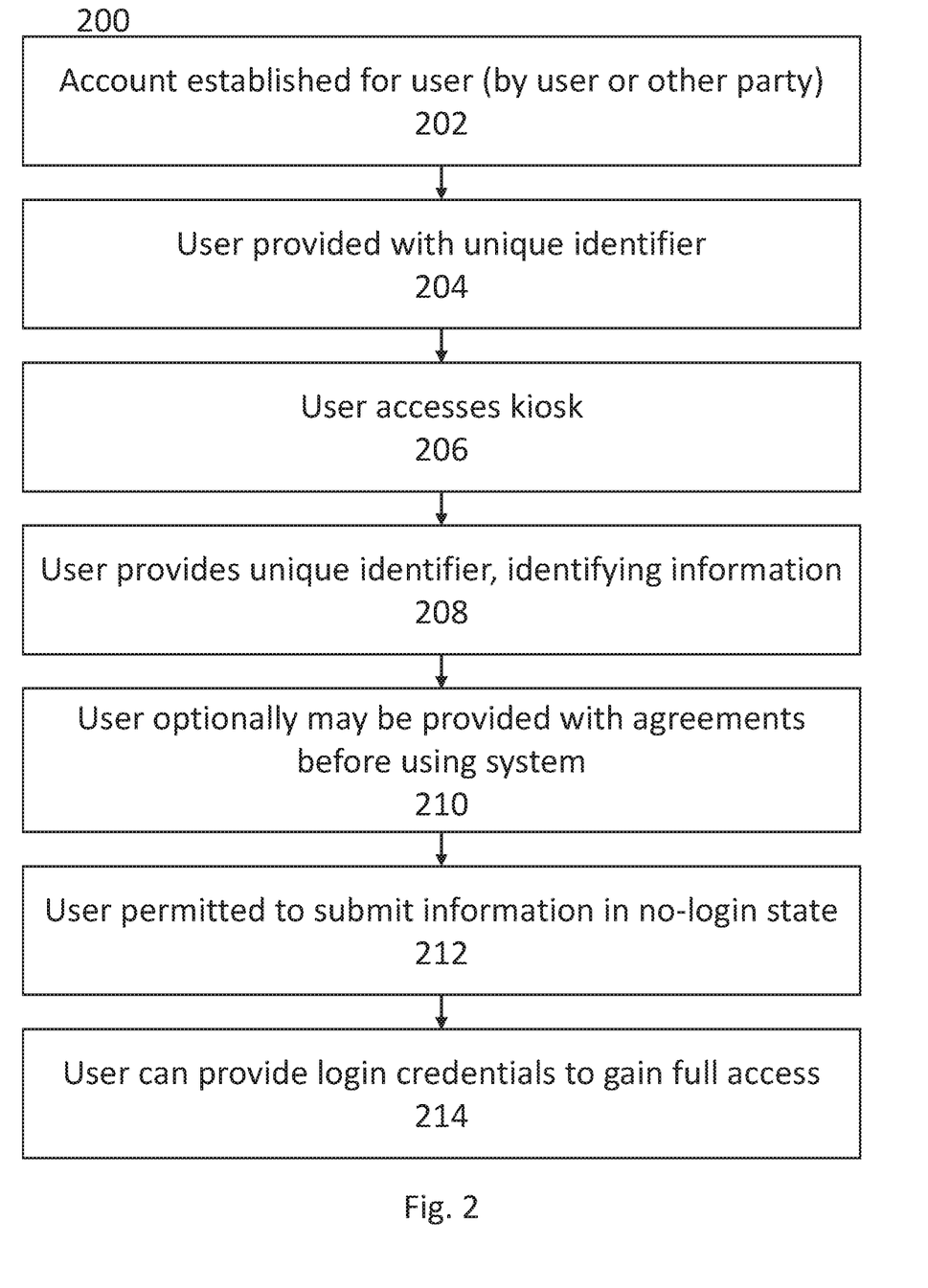
FIG. 2 is an exemplary flowchart depicting an exemplary embodiment of a process for collecting electronic protected health information without a login, in a "kiosk mode."

Turning now to exemplary FIG. 2, an alternative exemplary flowchart depicting an exemplary embodiment of a process for collecting electronic protected health information without a login 200 may be provided. Such an exemplary flowchart 200 may depict a "kiosk mode," wherein a user that is unable to access the information system from one of their own devices (or does not wish to access the information system from one of their own devices) may instead access the information system through a kiosk. According to an exemplary embodiment, a kiosk may be an interactive electronic device, such as a desktop or laptop computer, a tablet or mobile device, or another interactive device, as may be desired. In some exemplary embodiments, a kiosk may be a dedicated device; for example, in some embodiments, a booth kiosk with a tablet dedicated to running the kiosk software may be provided. In other exemplary embodiments, a device may be temporarily reconfigured into a kiosk mode by running appropriate software. A kiosk may be provided in and maintained in a facility of a provider, which may be, for example, an office, clinic, or hospital, or may be provided in another accessible location. This may facilitate information entry by patients who lack access to technology, ensuring that patients without such access (for example, patients that cannot afford an appropriate device, or patients that were taken to a hospital without their device, or any other such patients) can still make use of the information system.

According to an exemplary embodiment, a user may establish an account or may have an account established for them 202. (As noted above, according to some exemplary embodiments, there may be many ways in which this may be done; for example, in some exemplary embodiments, it may be contemplated that a staff member or other authorized user may create the account, may be contemplated that the account information may be imported from elsewhere or exported from another service to the present service, may be contemplated that the account may be shared with another service or otherwise created as part of a different service or on behalf of another organization, and so forth). The user may be provided with a unique identifier 204, which may be selectable by the user or may be provided to the user, which may be done contemporaneously with (or before or after) the user creates their account. This may be, for example, a PIN (such as a six-digit PIN) or may be other appropriate information.

A user then may access a kiosk 206 in order to deposit information. When the user attempts to access the kiosk 206, the user may be prompted to enter the unique identifier and their identifying information 208; in this way, the unique identifier may take the place of the unique link that would have been sent to the user had the user made use of another system. The user may then be provided with agreements before using the system 210 (which, again, as mentioned above, may be optionally moved to a different position in the method or may be optionally removed), may be able to submit information 212, and may optionally be able to login with full credentials 214.

Figure 3:
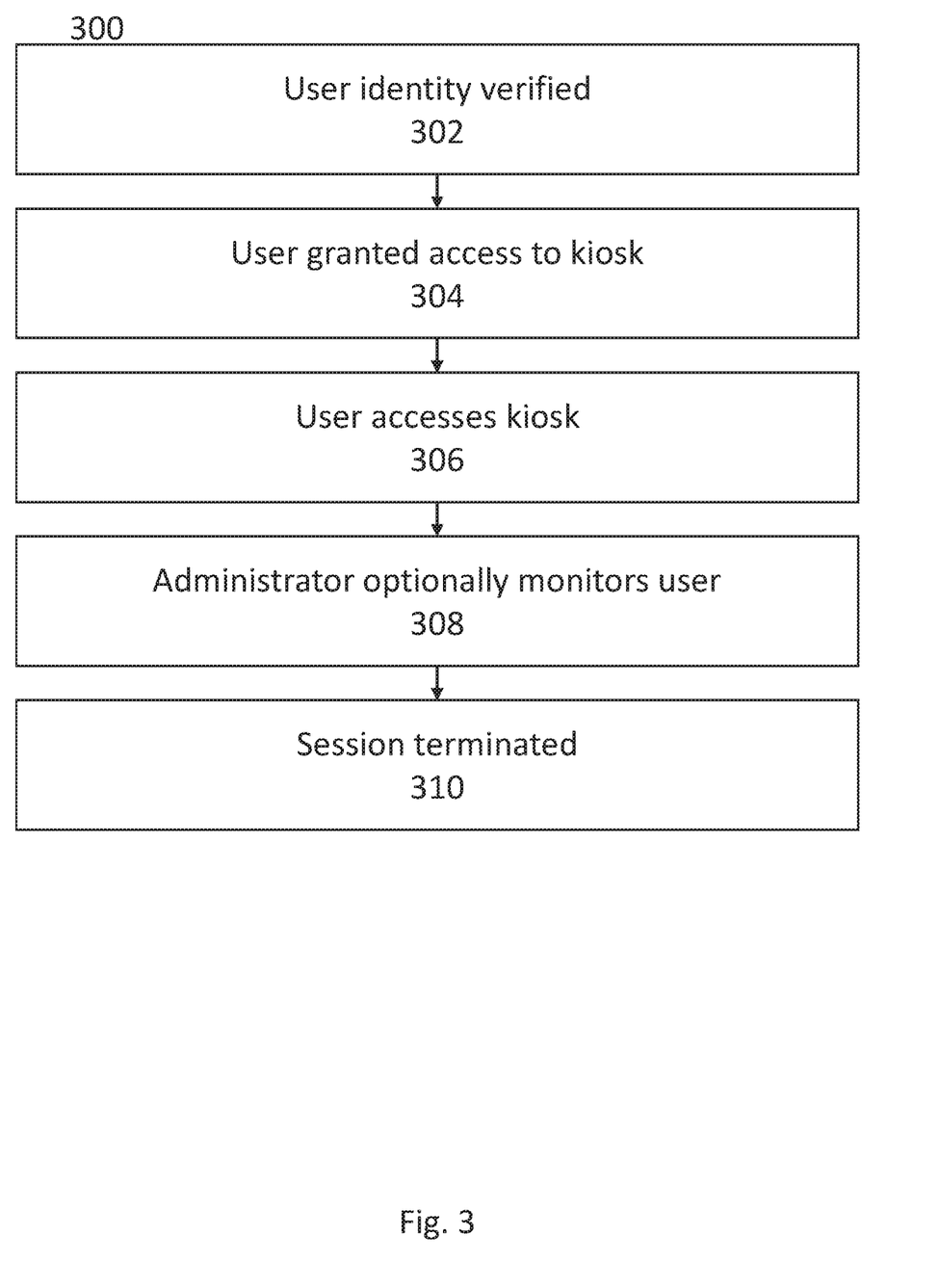
FIG. 3 is an exemplary flowchart depicting an exemplary embodiment of a process for collecting electronic protected health information without a login, in a "kiosk mode."

Turning now to exemplary FIG. 3, an alternative exemplary flowchart depicting an exemplary embodiment of a process for collecting electronic protected health information without a login 300 may be provided. Such an exemplary flowchart 300 may depict an alternative "kiosk mode."

According to an alternative embodiment of a "kiosk mode" 300, a user may not be provided a unique identifier before accessing the kiosk. Instead, the user—who may specifically be a user who is a patient—may not need to enter any information. Instead, one or more administrators of the kiosk (who may be, for example, hospital staff members) may verify the patient's identity, either personally or using a different utility. The administrator may then remotely trigger a device to provide access to the kiosk.

In an exemplary embodiment, the administrator may further trigger a device (for example, in the same operation as provision of access) to collect audio and/or video information from the kiosk. For example, if the user has initiated an audio and/or video connection on the kiosk, the user's audio and/or video connection may be provided to the administrator as well. The administrator then may be provided with remote functionality over the device so that they can monitor whether the user (for example, a patient) and the person that the user is connected to (for example, a healthcare provider) are both participating. In an embodiment, the administrator may be able to remotely end the session on the kiosk, for example if one or both of the user and the healthcare provider are not participating. (Alternatively, some or all of these processes may be automatic, such that a software service monitors whether the user or the other party is participating, based on attributes such as active call state information, a time period since either party last used the connection to make any sort of communication whatsoever, and so forth, such that the software service can automatically terminate the connection.) In an embodiment, the administrator may operate a dashboard that controls more than one kiosk; in an embodiment, an administrator may be able to assign device names and control many devices simultaneously from a single dashboard.

In the process depicted in exemplary FIG. 3, a user may have their identity verified 302. The user may then be granted access to a kiosk by an administrator 304, which they may then access 306. The administrator may monitor the user 308 during their session. (In some exemplary embodiments, this may be optional, and an administrator may have the option to monitor the user 308 during their session that they may choose not to exercise, or the step of monitoring the user 308 may be performed by a different service such as a software service or may not be performed at all.) The administrator may then opt to remotely end the session 310, for example by a control dashboard. (Alternatively, the session may be terminated 310 remotely, for example by a software service that determines when the session is over, such as by listening for particular keywords or by waiting for a sufficiently long period of inactivity. This may cause the session to automatically timeout or automatically finish and end, such as may be desired. Alternatively, users may end the session, such as may be desired.)

Figure 4:
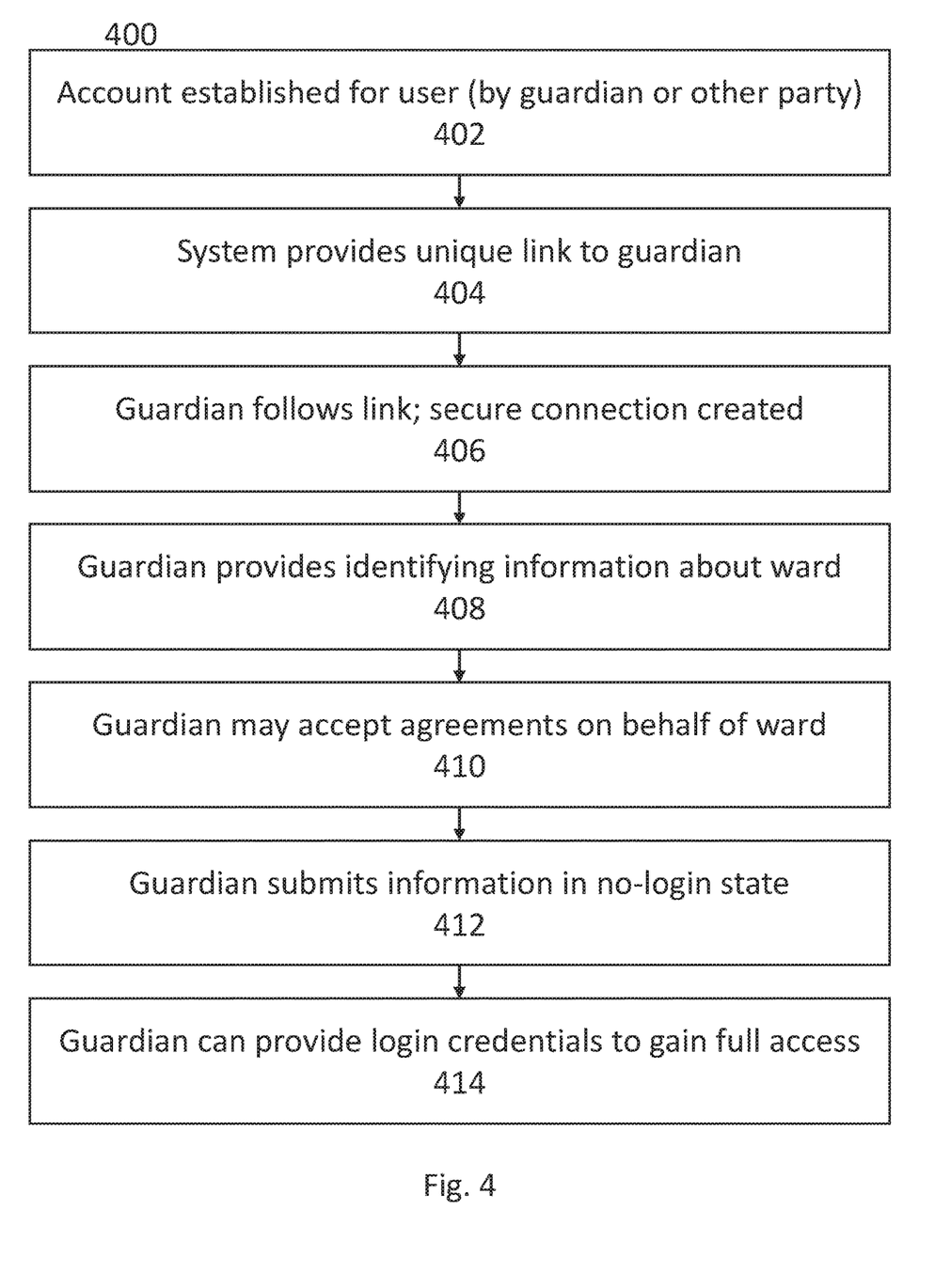
FIG. 4 is an exemplary flowchart depicting an exemplary embodiment of a process for collecting electronic protected health information from a first party on behalf of a second party without a login.

Turning now to exemplary FIG. 4, FIG. 4 displays an exemplary flowchart depicting an exemplary embodiment of a process for collecting electronic protected health information without a login 400 from a user unable to provide the information themselves.

According to an exemplary embodiment, it may be desired to empower a guardian, such as a guardian of a person under the age of consent, a person who is mentally incapacitated, or a person who is otherwise disabled, to deposit information on behalf of their ward. According to an exemplary embodiment, the guardian 402 may establish an account on behalf of the ward, or may take over an existing account (such as an account made by the ward before becoming physically or mentally incapacitated). (According to an exemplary embodiment, an account may also be established as contemplated in previous embodiments; for example, it may have to be created by an authorized staff member, or may be imported from another service or shared with another organization, and so on and so forth.) The system may then provide a unique link to the guardian 404 instead of to the ward. The guardian may then follow the link 406. The guardian may then enter some piece of information about the ward in order to verify the identity of the ward 408; according to an exemplary embodiment, in some cases, it may be desired to have the guardian enter a piece of information about the guardian instead. The guardian may then accept agreements on behalf of the ward 410 (if any agreements are to be accepted; this may depend on, for example, whether the system contemplates that any agreements need to be provided at all, as well as whether a ward has previously signed these agreements, and whether any new agreements need to be signed authorizing aspects peculiar to the guardianship embodiment). The guardian may then be able to submit information in a no-login state 412, and may be able to provide login credentials to gain full access 414, should this be desired.

Now referring generally to the Figures, one or more tasks may be completed before, during, or after the execution of any of the aforementioned processes. For example, according to an exemplary embodiment, a process may include connecting to or collecting data from any stakeholder in the process, which may include doctors, nurses, caregivers, counselors, case managers, or any other stakeholders, as may be desired. In an exemplary embodiment, one or more pieces of information may be collected; in some embodiments, what information is requested at any time may differ, such that each session is dynamic based on what is being requested from that particular stakeholder at a particular stage in the process.

In an exemplary embodiment, multiple layers of data may be collected in a single session, which may, for example, be maintained as a no-login session. For example, according to an exemplary embodiment, a user may sign into their account via a no-login method. The user may then be asked to sign consents and to complete one or more assessments. Following the completion of the consents and the assessments, the user may be connected to, or may have the option to connect to, a live audio/video session.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for providing an efficient and secure interface for transferring protected electronic information, comprising:
   providing a transfer page, the transfer page comprising a web page supporting at least one of uploading of protected electronic information, submission of intake forms, or live video or audio conferencing;
   generating and providing, from a server, a unique access link, the unique access link comprising a uniform resource locator (URL) directed to the transfer page;
   receiving a request, from a user device or kiosk, to access the transfer page;
   obtaining, from the user device or kiosk, a personal identifier, the personal identifier comprising at least one of a record of the user or an identification of at least one personal characteristic of the user;
   verifying the personal identifier;
   when the personal identifier is verified, granting the user device or kiosk access to upload protected electronic information, submit intake forms, or connect to live video or audio conferencing on the transfer page; and
   wherein the transfer page is a no-login page using identity verification for uploading electronic information, submitting intake forms, or connecting to live video or audio conferencing and wherein full login is required to access or download protected electronic information.

2. The method of claim 1, further comprising a full login, wherein the full login permits at least one of access to or downloading of protected electronic information.

3. The method of claim 2, wherein the personal identifier is stored as a login credential for the full login.

4. The method of claim 1, wherein the unique access link expires after a set time interval.

5. The method of claim 1, wherein the unique access link is sent by one or more of email, SMS, or push notification.

6. The method of claim 1, wherein the user device or kiosk is connected to a real-time audio, video, or audio/video conference.

7. The method of claim 1, wherein identity verification requires data captured in real-time by a user device or kiosk.

8. A system for providing an efficient and secure interface for transferring protected electronic information, the system comprising a server device and a network connection, the server device being configured to execute steps comprising:
   providing a transfer page supporting at least one of uploading of protected electronic information, submission of intake forms, or live video or audio conferencing;
   generating and providing, from a server, a unique access link, the unique access link comprising a uniform resource locator (URL) directed to the transfer page;
   receiving a request, from a user device or kiosk, to access the transfer page;
   obtaining, from the user device or kiosk, a personal identifier, the personal identifier comprising at least one of a record of the user or an identification of at least one personal characteristic of the user;
   verifying the personal identifier;
   when the personal identifier is verified, granting the user device or kiosk access to upload protected electronic information, submit intake forms, or connect to live video or audio conferencing on the transfer page; and wherein the transfer page is a no-login page using identity verification for uploading electronic information, submitting intake forms, or connecting to live video or audio conferencing and wherein full login is required to access or download protected electronic information.

9. The system of claim 8, further comprising a full login, wherein the full login permits at least one of access to or downloading of protected electronic information.

10. The system of claim 9, wherein the personal identifier is stored as a login credential for the full login.

11. The system of claim 8, wherein the unique access link expires after a set time interval.

12. The system of claim 8, wherein the unique access link expires after it has been followed a predetermined number of times.

13. The system of claim 8, wherein the user device or kiosk is connected to a real-time audio, video, or audio/video conference.

14. The system of claim 8, wherein identity verification requires data captured in real-time by a user device or kiosk.

15. A non-transitory computer readable medium having stored thereon software instructions that, when executed by a processor, cause the processor to:
 receive, from a server, a unique access link directed to a transfer page, wherein the transfer page supports at least one of uploading of protected electronic information, submission of intake forms, or live video or audio conferencing;
 request access to the transfer page using a personal identifier comprising at least one of a record of a user or an identification of at least one personal characteristic of the user;
 upon verification of the personal identifier, access the transfer page to upload protected electronic information, submit intake forms, or connect to live video or audio conferencing on the transfer page;
 wherein the transfer page is a no-login page using identity verification for uploading electronic information, submitting intake forms, or connecting to live video or audio conferencing and wherein full login is required to access or download protected electronic information.

16. The non-transitory computer readable medium of claim 15, further comprising requesting a full login using login credentials, wherein the full login permits at least one of access to or downloading of protected electronic information.

17. The non-transitory computer readable medium of claim 15, wherein the unique access link expires after a predetermined time interval or after being followed a predetermined number of times.

18. The non-transitory computer readable medium of claim 15, further comprising capturing real time data using a camera, audio recording device, or graphical user interface for identity verification and sending the real time data to a server for verification.

* * * * *